(12) United States Patent
Rief et al.

(10) Patent No.: US 6,786,648 B2
(45) Date of Patent: Sep. 7, 2004

(54) OPTICAL FIBER COUPLING UNIT AND OPTICAL WAVEGUIDE ARRANGEMENT, AND METHOD OF PRODUCING AN OPTICAL FIBER COUPLING UNIT

(75) Inventors: Angela Rief, Munich (DE); Wolfgang Schweiker, Weyarn (DE); Frank Zimmer, Scheuring (DE)

(73) Assignee: CCS Technology, Inc., Wilmington, DE (US)

( * ) Notice: Subject to any disclaimer, the term of this patent is extended or adjusted under 35 U.S.C. 154(b) by 79 days.

(21) Appl. No.: 10/047,569

(22) Filed: Jan. 15, 2002

(65) Prior Publication Data

US 2002/0122635 A1 Sep. 5, 2002

(30) Foreign Application Priority Data

Jan. 24, 2001 (DE) .......................................... 101 03 125

(51) Int. Cl.[7] ................................................. G02B 6/36
(52) U.S. Cl. ............................................................ 385/80
(58) Field of Search ............................... 385/39, 43, 52, 385/54, 55, 70–72, 76–78, 80, 88

(56) References Cited

U.S. PATENT DOCUMENTS

| | | | | |
|---|---|---|---|---|
| 4,264,127 A | * | 4/1981 | Schumacher et al. | 385/80 |
| 4,743,084 A | * | 5/1988 | Manning | 385/80 |
| 6,540,411 B1 | * | 4/2003 | Cheng | 385/80 |
| 6,595,697 B2 | * | 7/2003 | Hirabayashi et al. | 385/78 |

* cited by examiner

*Primary Examiner*—Javaid H. Nasri (57) ABSTRACT

Optical fiber coupling unit and optical waveguide arrangement, and method of producing an optical fiber coupling unit. The optical fiber coupling unit 1 has: an optical fiber 2, which has a fiber core 4 and a fiber cladding 6 surrounding the fiber core 4, and a sleeve 8, which is arranged on an end portion of the optical fiber 2 and terminates flush with the associated extreme end 14 of the optical fiber 2, so that on this extreme end 14 there is formed a continuous coupling face 16, with which the optical fiber coupling unit 1 can be placed against an optical waveguide component to establish an optical coupling.

17 Claims, 8 Drawing Sheets

OPTICAL FIBER COUPLING UNIT AND OPTICAL WAVEGUIDE ARRANGEMENT, AND METHOD OF PRODUCING AN OPTICAL FIBER COUPLING UNIT

CROSS-REFERENCE TO RELATED APPLICATIONS

This application claims the benefit of priority under 35 U.S.C. § 119 of German Patent Application No. 101 03 125.4 filed on Jan. 24, 2001.

FIELD OF THE INVENTION

The invention relates to an optical fiber coupling unit for coupling an optical fiber to an optical waveguide component, in particular to a planar optical waveguide component, such as an optical chip for example. The invention also relates to an optical waveguide arrangement and a method of producing an optical fiber coupling unit.

BACKGROUND OF THE INVENTION

For coupling optical fibers, for example glass fibers, to an optical chip, on which optical structures are provided, today the optical fibers are usually bonded onto the chip by means of an adhesive. When doing so, the optical fibers are generally bonded with their front-end faces onto an associated end face of the chip.

A typical optical fiber contains a fiber core and a fiber cladding surrounding the fiber core, which together form the actual light guide. To protect the optical fiber, it, i.e. the arrangement comprising the fiber core and fiber cladding, is usually provided with a sheathing, for example in the form of a coating applied directly to the fiber cladding. The coating typically consists of plastic. The sheathing may, furthermore, have an additional outer layer, for example the coating may be additionally buffered with a resistant flexible material, as also used for cables.

The outside diameter of a standard single-mode glass fiber with a fiber core and fiber cladding, that is without the sheathing, is typically 125 $\mu$m. The resulting end face of the individual optical fiber is not sufficient in this case to achieve a stable and reliable adhesive bond between the end face of the optical fiber and the chip.

In the case of a known coupling unit for coupling one or more optical fibers, what is known as a fiber array is adhesively bonded onto the optical chip to achieve a stable and reliable bond.

Figure 1:
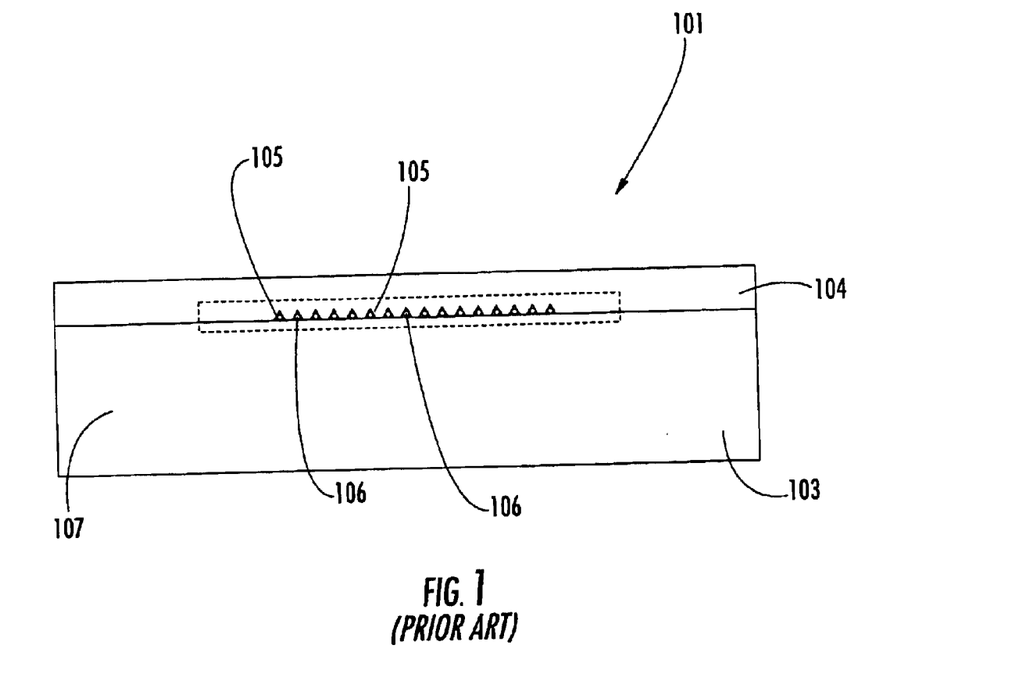
FIG. 1 shows a fiber array according to the prior art in a view from the front.

FIG. 1 shows such a fiber array 101 according to the prior art in a view from the front. The fiber array 101 is made up of a base plate 103, a V-groove platelet 104, in which a plurality of V grooves 105 arranged at a distance from one another and running parallel to one another have been formed, and a plurality of optical fibers 106, which have been laid in the associated V grooves 105. In this case, generally the optical fibers 106 are first laid in the V grooves 105. Then, the V-groove platelet 104 together with the optical fibers 106 and the base plate 103 are bonded together, whereby the optical fibers 106 are fixed in the V grooves 105. The end face 107 of the arrangement comprising the V-groove platelet 104 together with the optical fibers 106 and base plate 103 is subsequently ground and polished, so that a planar coupling face is created for bonding the fiber array 101 onto a chip. As can be seen from FIG. 2, the fiber array 101 is attached by this coupling face to the associated extreme end of an optical chip 108 to establish an optical coupling.

Figure 2:
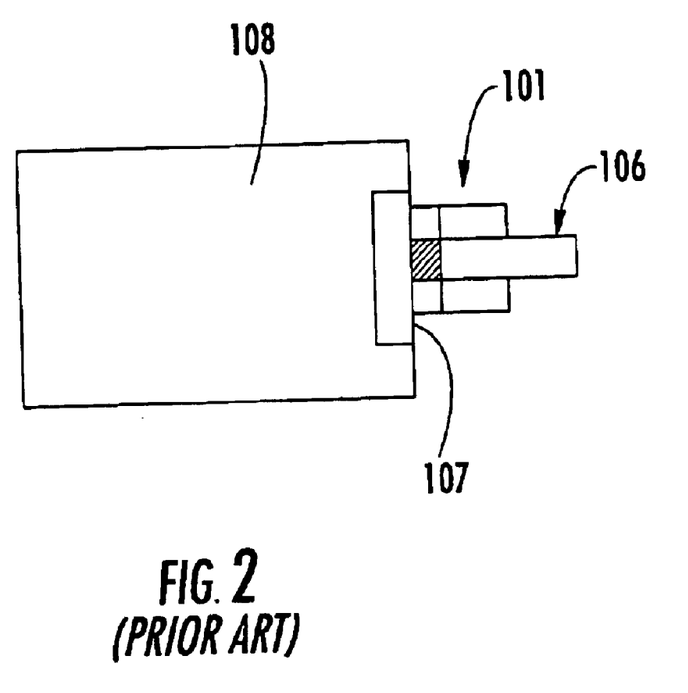
FIG. 2 shows the fiber array from FIG. 1 in plan view, with its coupling face coupled onto an optical chip.

To ensure a precise and controlled coupling of the optical fibers 106 onto the chip 108, the V-groove platelet 104 must be fabricated very accurately. The fabrication of V-groove platelets with sufficiently high precision is achieved for example by etching. However, because of the small dimensions of the V grooves 105, this fabrication is complex.

SUMMARY OF THE INVENTION

The invention provides an optical fiber coupling unit for a optical fiber, by means of which coupling unit the optical fiber can be optically coupled to an optical waveguide component in a reliable way, and which has a simple construction and can consequently be realized at low cost. The invention also provides a method of producing an optical fiber coupling unit, with which the optical fiber coupling unit according to the invention can be precisely produced in a simple way.

DETAILED DESCRIPTION OF THE INVENTION

The optical fiber coupling unit according to the invention has: an optical fiber and a sleeve, which is arranged on an end portion of the optical fiber and terminates flush with the extreme end, i.e. flush with the associated end face, of the optical fiber, so that on this extreme end there is formed a continuous coupling face, with which the optical fiber coupling unit can be placed onto an optical waveguide component to establish an optical coupling.

The coupling face jointly formed by the optical fiber and the sleeve forms a sufficiently large placement face for placing and bonding onto an optical component, such as an optical chip for example, so that a reliable mechanical, and consequently ultimately optical, coupling is achieved between the optical fiber and the optical component. The sleeve is formed in particular as a circumferentially closed sleeve and consequently extends preferably uninterruptedly around the optical fiber. The sleeve for its part represents a component which is simple to produce; it is envisaged here in particular to use already existing standard components, such as ferrules in particular, as sleeves.

The inside diameter of the outer sleeve is preferably not much greater than the outside diameter of the optical fiber, so that the sleeve represents in particular a capillary. The optical fiber is advantageously closely surrounded by the sleeve, in particular with a distance between the optical fiber and the inner wall of the sleeve of 1–5 $\mu$m. That is to say that the inside diameter of the sleeve is preferably approximately 2 to 10 $\mu$m greater than the outside diameter of the optical fiber accommodated in it.

The close fit thereby achieved on the one hand fixes the optical fiber in the sleeve. On the other hand, it prevents the optical fiber from assuming a skewed position in the sleeve and/or experiencing bends or kinks, whereby the attenuation of the optical fiber for light passed through would be increased.

However, depending on the accuracy requirement, the inside diameter of the sleeve may also be considerably greater, i.e. for example more than 10 $\mu$m, than the outside diameter of the optical fiber, so that the optical fiber can be inserted with sufficient play in the sleeve. In any event, the intermediate space between the optical fiber and the sleeve is preferably filled with a filling material, for example hot-melt adhesive, by which the optical fiber and the sleeve are fixed against each other.

The optical fiber is preferably bonded into the sleeve by means of adhesive. This takes place in particular by the optical fiber being provided laterally on its end portion with the adhesive agent and subsequently inserted into the sleeve. That is to say the adhesive agent is provided in particular lengthwise between the optical fiber and the sleeve.

The coupling face may extend perpendicularly with respect to the longitudinal axis of the optical fiber. However, the coupling face is preferably beveled, thereby avoiding partial reflection back into the optical fiber at the coupling face of light emerging from the optical fiber at the coupling face. The coupling face is preferably beveled here at an angle of 8 degrees, so that the coupling face is consequently inclined at an angle of 82 degrees with respect to the longitudinal axis of the optical fiber.

The sleeve may in principle be made of any desired material which is sufficiently solid to allow the optical fiber to be held and reliably attached, in particular bonded, to the optical waveguide component. The sleeve is preferably made of a material which has the same, or substantially the same, coefficient of thermal expansion as the optical fiber material. Since the optical fibers are made in particular of a glass material, the sleeve is consequently preferably made of a glass material or a ceramic material.

A commercially available glass capillary may be used as the sleeve. Capillaries of this type are generally circular-cylindrical tubes with a circular-cylindrical bore. They are commercially available inexpensively in a wide variety of dimensions and nevertheless have a sufficiently high fabrication accuracy for the invention.

As explained above, a ferrule obtainable in telecommunications is particularly envisaged as the sleeve. Ferrules are tubular elements which are standardized in connector technology and are available in particular in the form of glass or ceramic ferrules. They are typically circular-cylindrical with a circular-cylindrical bore and have a high fabrication accuracy, while they are nevertheless inexpensive. For example, ferrules with an inside diameter of 127 $\mu$m are offered with a fabrication tolerance in this respect of +1 $\mu$m. Such a ferrule is consequently well-suited according to the invention for an optical fiber with an outside diameter of 125 $\mu$m.

The sleeve preferably has an outside diameter of at least 2 mm, in particular of 2 mm to at most 10 mm. With these outside diameters, a sufficiently large coupling face is attained to achieve a reliable and permanent adhesive bond between the coupling face and a placement face on an optical waveguide component, on which placement face the optical fiber coupling unit is placed with its coupling face. The outside diameter is also to be regarded here as the peripheral diameter of a non-circular coupling face in the case for example of a cross-sectionally non-circular sleeve. Greater outside diameters are possible in principle, but generally not advantageous because of the excessive space requirement.

Like the conventional ferrule for example, the sleeve preferably has a cylindrical, in particular circular-cylindrical, outer shape and is provided with a cylindrical, in particular circular-cylindrical, through-bore, which extends in its longitudinal direction and through which the optical fiber extends.

The sleeve preferably has a planar surface on its periphery. Such a planar surface may be produced in the case of a circular-cylindrical sleeve by circumferential grinding for example. The planar surface serves as a face for placing onto a planar alignment face assigned to it, which is provided for example on the optical waveguide component or on a fitting aid. That is to say the sleeve is placed with its planar outer surface on the alignment face, whereby the sleeve and consequently the optical fiber arranged in it are aligned with respect to their circumferential direction. This allows it to be optically coupled exactly to a correspondingly aligned optical waveguide component, just by it then being pushed axially up to said component. The provision of a planar surface on the circumference of the sleeve is of advantage in particular if the coupling face and the placement face assigned to it on the optical waveguide component, such as the end face of an optical chip for example, are beveled. In this case, the placement face is ground at the same angle as the end face of the optical fiber coupling unit, so that the optical fiber coupling unit can be placed with its coupling face flat against the placement face of the optical waveguide component. The planar surface on the sleeve facilitates here the correct alignment of the mutually opposed sloping faces, that is to say the coupling face and the placement face.

The planar surface may be provided at any desired location on the circumferential surface of the sleeve. A plurality of planar surfaces may also be provided, for example a planar surface on opposite sides of the sleeve, so that the sleeve is bounded in cross section by straight lines lying opposite each other, in particular parallel to each other, and two arc-of-a-circle segments lying in between.

The planar surface is preferably provided alongside the coupling face and, furthermore, preferably extends up to the coupling face. Consequently, the optical fiber coupling unit can be placed with its planar surface at the extreme end against a planar alignment face assigned to the latter.

The sleeve is preferably made of a material which has a coefficient of thermal expansion substantially corresponding to that of the optical fiber. As a result, thermal stresses between the optical fiber and the sleeve are avoided.

In the event that the optical fiber, which has a fiber core and a fiber cladding surrounding the latter, is provided with a sheathing, which is formed for example by a coating applied directly to the optical fiber and a buffer arranged over that (conductor with insulating sheathing), the optical fiber can be inserted together with its sheathing into the sleeve. The sleeve in this case preferably has an inside diameter which is 2 to 10 µm greater than the outside diameter of the covered optical fiber, i.e. 2 to 10 µm greater than the outside diameter of the sheathing.

For the reason mentioned above, i.e. to avoid thermal stresses between the optical fiber and the sheathing, which is generally not made of a light-conducting material, a coating which may be present on the optical fiber, and is made of plastic for example, and a buffer which may be surrounding the coating (conductor with insulating sheathing) are removed toward the extreme end of the optical fiber, so that the optical fiber extends out of the sheathing with an exposed end portion, on which the sleeve is arranged. Consequently, in the end portion of the optical fiber, the sleeve is preferably arranged directly on the optical fiber, that is to say with the exception of the adhesive arranged in between.

The sheathing may be arranged, for example, with its extreme end up against the sleeve or at least alongside it. According to a preferred embodiment of the invention, the sleeve extends with an end portion remote from the extreme end of the optical fiber over the sheathing, the latter being accommodated snugly in the sleeve in an advantageous way. As a result, the optical fiber is protected even better against buckling, since that location at which the sheathing is detached from the optical fiber is not exposed but is covered by the sleeve. Furthermore, forces present in the sheathing are also at least partially absorbed by the sleeve portion extending part way over the sheathing, thereby ultimately relieving the optical fiber.

The inside diameter of the rear sleeve portion, which is remote from the extreme end of the optical fiber to be coupled onto the optical waveguide component, is preferably 2 to 10 µm greater than the outside diameter of the sheathing. That is to say the distance between the sheathing and the associated inner wall of the sleeve is preferably 1 to 5 µm. The sleeve is preferably solidly bonded to the sheathing, in particular by means of an adhesive agent, so that the optical fiber is relieved of tension, since tensile forces are introduced from the sheathing into the sleeve via this bond.

The optical fiber coupling unit according to the invention can be produced in the following way:

According to one possible method, firstly the sleeve and the optical fiber are individually ground and/or polished on one of their extreme ends, thereby forming a planar end face, in particular in such a way that the respective end face is formed as a sloping face and preferably runs at an angle of 82 degrees with respect to the longitudinal axis of the sleeve or fiber. Subsequently, the sleeve is pushed, with its end remote from the sloping face in front, over the optical fiber. After that, the sleeve and the optical fiber are aligned with their faces at the extreme ends, in particular sloping faces, flush with respect to one another, so that the continuous, stepless coupling face is formed at the extreme ends.

According to the preferred method according to the invention for producing the optical fiber coupling unit according to the invention, a sleeve is pushed onto an end portion of an optical fiber and fastened to the optical fiber. In this case, the sleeve is advantageously pushed over the optical fiber to the extent that the latter protrudes with its free end out of the sleeve by approximately 2–3 mm. Before the sleeve is pushed onto the optical fiber, the latter is preferably provided laterally, or the sleeve is provided on its inner side, with an adhesive agent, which provides an adhesive bond between the optical fiber and the sleeve. Subsequently, the sleeve with the optical fiber accommodated in it is ground and/or polished at the extreme end, thereby forming a continuous, i.e. stepless, coupling face at the extreme end. The grinding and/or polishing may be performed in such a way that the coupling face is formed as a sloping face and runs in particular at an angle of approximately 82 degrees with respect to the longitudinal axis of the optical fiber (and the sleeve).

In the case of this method, a planar, i.e. stepless, coupling face is obtained in a simple and consequently low-cost way. The fastening of the optical fiber in the sleeve is preferably performed by means of bonding the optical fiber into the sleeve.

The optical fiber is preferably bonded by being wetted with an adhesive before it is inserted into the sleeve, said adhesive filling the intermediate space between the sleeve and the optical fiber after it has been inserted.

Alternatively, the sleeve may first be completely filled with adhesive and the optical fiber subsequently inserted into the sleeve, part of the adhesive being forced out of the sleeve again.

In the case of a two-part sleeve with an inner sleeve and an outer sleeve, the optical fiber is first inserted into the inner sleeve and bonded to the latter, in particular in the way described above. Subsequently, the outer sleeve is pushed over the inner sleeve and the sheathing and fixed on the inner sleeve and the sheathing by means of an adhesive bond. Finally, the planar coupling face is produced by grinding and/or polishing.

The optical waveguide arrangement according to the invention has an optical waveguide component, in particular an optical chip, which has a placement face, in particular a planar placement face, from which an optical structure extends, and also an optical fiber coupling unit according to the invention, which is placed with its coupling face against the placement face of the optical waveguide component, thereby establishing optical coupling between the optical fiber and the optical structure, and is fastened on said placement face, preferably by means of an adhesive bond.

Preferred embodiments of the invention are described below with reference to the drawings.

In the drawings, the same designations are used for the same parts.

Figure 3A:
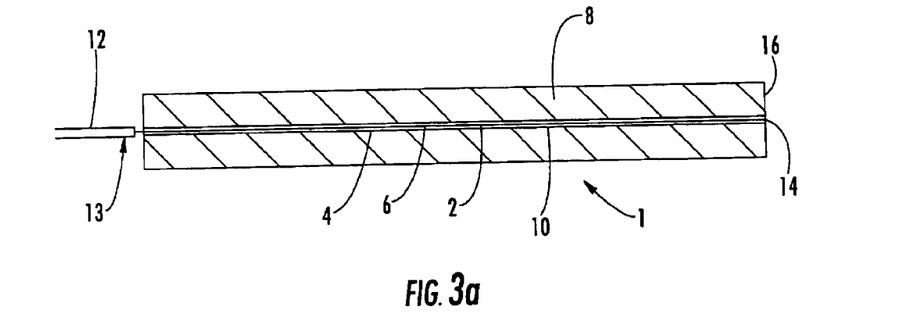
FIG. 3a shows an embodiment of the optical fiber coupling unit according to the invention in longitudinal section.

FIG. 3a shows an optical fiber coupling unit 1 according to one embodiment of the invention in longitudinal section.

The optical fiber coupling unit 1 shown in FIG. 3a has an elongate optical fiber 2 with a fiber core 4 and a fiber cladding 6, surrounding the fiber core 4, and also an elongate sleeve 8 in the form of a capillary.

Figure 3B:
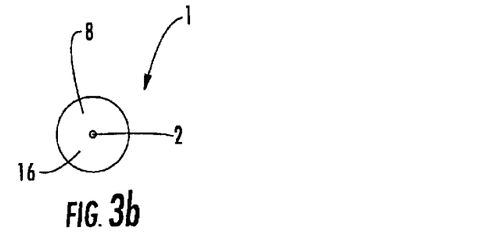
FIG. 3b shows the optical fiber coupling unit from FIG. 3a in a view from the front.

FIG. 3b shows the optical fiber coupling unit 1 according to FIG. 3a in a view from the front, i.e. the optical fiber coupling unit 1 according to FIG. 3a from the right. The optical fiber 2 and the sleeve 8 have a circular outer cross section.

A standard single-mode glass fiber with an outside diameter, i.e. a fiber cladding diameter, of 125 µm may be used as the optical fiber 2. A glass capillary with an outside diameter of 3 mm, an inside diameter of 128 μm+2 μm tolerance and a length of at least 2 to 10 mm is, for example, provided as the sleeve 8. The intermediate space between the optical fiber 2 and the sleeve 8 is filled with an adhesive.

The optical fiber 2 protrudes with an exposed, front end portion 10 out of a sheathing 12, by which it is otherwise surrounded. The optical fiber 2 and the sheathing 12 surrounding it form a fiber-optic cable 13 or a stranded wire of a multi-stranded-wire fiber-optic cable. The sleeve 8 is arranged on this exposed end portion 10 of the optical fiber 2 and terminates at the front flush with the extreme end 14 of the optical fiber 2, so that at this extreme end 14 a continuous, i.e. extending over the extreme end 14 of the optical fiber 2 and the extreme end of the sleeve 8, planar coupling face 16 is formed, with which the coupling unit 1 can be placed against an optical waveguide component, for example an optical chip, or else another coupling unit, in order in this way to establish an optical coupling of the optical fiber 2 with the optical waveguide of the optical waveguide component. The coupling face 16 runs perpendicularly with respect to the longitudinal axis of the cylindrical optical fiber 2 and the cylindrical sleeve 8.

The sheathing 12 consists of a plastic coating resting directly on the fiber cladding and a buffer surrounding the coating, known as the conductor with insulating sheathing. In the region of the sleeve 8, the optical fiber 2 has been freed of the sheathing 12, thereby forming said exposed portion 10.

Figure 4A:
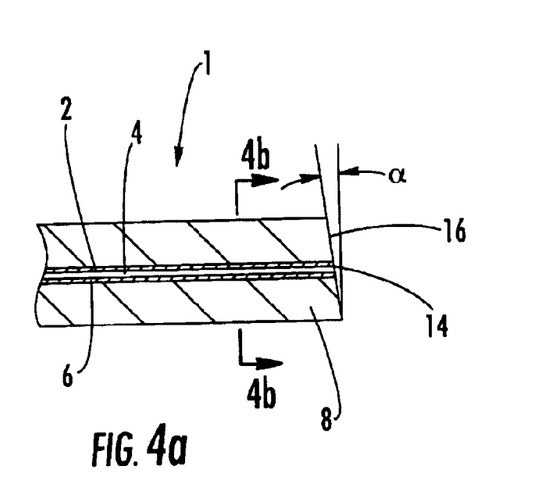
FIG. 4a shows a schematic partial view of another embodiment of the optical fiber coupling unit according to the invention in longitudinal section, FIG. 4b schematically shows the optical fiber coupling unit from FIG. 4a in a cross section along the line 4b–4b.
Figure 4B:
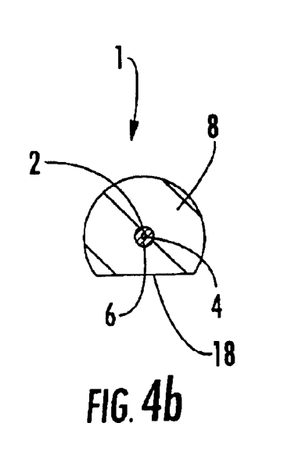

FIG. 4a schematically shows a partial view of another embodiment of the optical fiber coupling unit 1 according to the invention in longitudinal section. FIG. 4b shows the optical fiber coupling unit 1 from FIG. 4a in cross section along the line 4b–4b in FIG. 4a.

The optical fiber coupling unit 1 from FIG. 4a corresponds substantially to that coupling unit 1 described on the basis of FIGS. 3a and 3b; however, in comparison with the optical fiber coupling unit 1 from FIGS. 3a, 3b, it has a coupling face 16 beveled at an angle α of 8 degrees (FIG. 4a), that is to say 8 degrees with respect to a coupling face perpendicular to the longitudinal axis of the fiber or 82 degrees with respect to the longitudinal axis of the fiber.

If the optical fiber coupling unit 1 according to the embodiment from FIGS. 4a, 4b is coupled onto an optical chip, the chip is beveled at a placement face, against which the optical fiber coupling unit 1 is placed with its coupling face 16, in such a way that it matches the coupling face 16 of the optical fiber coupling unit 1 at an angle of 8 degrees in the same direction, so that the coupling face 16 and the placement face can be placed flat against each other when the optical waveguides (optical fiber 2 and light guiding structure of the chip) are aligned such that they are in line with each other. The fact that the sleeve 8 terminates flush with the extreme end 14 of the optical fiber 2 has the effect that the coupling face 16 extends continuously, i.e. in a stepless and consequently planar manner, over the extreme end of the optical fiber 2 and the sleeve 8. That is to say both the end face of the sleeve 8 and the end faces of the fiber core 4 and the fiber cladding 6 of the optical fiber are beveled at the angle α.

It can be seen from FIG. 4b that the sleeve 4 has on its circumferential surface a flattened portion in the form of a planar surface 18. The planar surface 18 makes it easier to align the optical fiber coupling unit 1 correctly in the rotational direction about its longitudinal axis when it is being coupled onto an optical waveguide component, such as the optical chip. This allows the coupling face 16, provided as a sloping face, to be placed more easily in such a way that it fits against the placement face assigned to it, likewise formed as a sloping face, on the optical waveguide component, which for this purpose has for example a likewise planar alignment face, against which the coupling unit 1 can be placed by its planar circumferential surface 18, thereby aligning its coupling face 16 with respect to the placement face. However, the optical waveguide component and the optical fiber coupling unit 1 may also be placed with their aligning face or their planar circumferential surface 18 onto a separate, planar aligning part and, guided by this, in particular also additionally laterally guided, be placed with their extreme ends against each other.

Figures 5A, 5B:
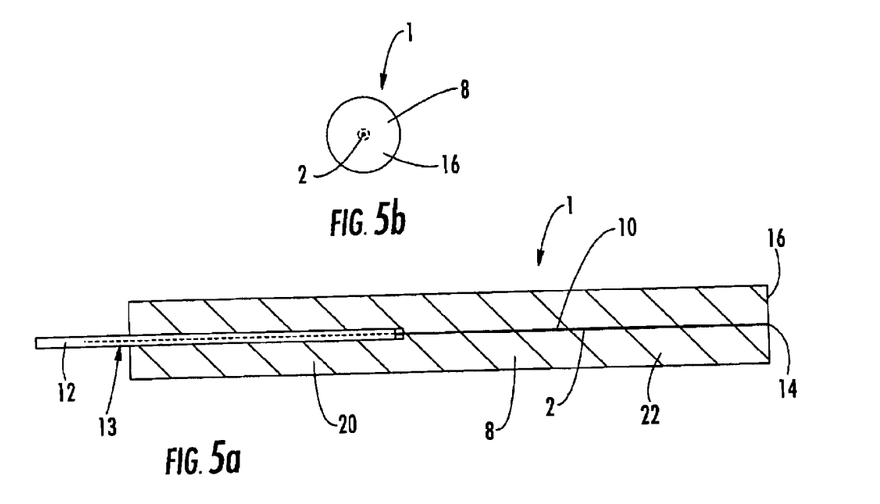
FIG. 5a shows another embodiment of the optical fiber coupling unit according to the invention in longitudinal section.
FIG. 5b shows the optical fiber coupling unit from FIG. 5a in a view from the front.

FIG. 5a shows another embodiment of the optical fiber coupling unit 1 according to the invention in longitudinal section. In the case of this embodiment, a fiber-optic cable 13 is provided with an optical fiber 2 and a sheathing 12, by which the optical fiber 2 is surrounded. The optical fiber 2 is freed in its end portion 10, on the right in FIG. 5a, of the sheathing 12 toward the associated extreme end 14, so that this end portion 10 of the optical fiber 2 represents an exposed portion.

The exposed end portion 10 of the optical fiber 2 is closely surrounded by a circular-cylindrical, closed sleeve 8, which terminates flush with the end face of the optical fiber 2, thereby forming a continuous coupling face 16 at the extreme end.

The sleeve 8 extends from the extreme end 14 of the optical fiber 2 with a rear sleeve portion 20 over the sheathing 12 and closely encloses the latter. The sheathing 12 is solidly bonded here to the sleeve 8 by means of adhesive; the exposed end portion 10 of the optical fiber 2 is also bonded by means of adhesive into the associated front sleeve portion 22.

The sheathing 12 may be formed by a coating applied directly to the optical fiber 2 and a buffer surrounding said coating. In this case, it may also be provided that the coating extends with an exposed end portion out of the buffer, only the exclusively coated part of the optical fiber 2 being surrounded by the sleeve 8, that is to say by its rear sleeve portion 20, whereas the buffer is detached in front of the end of the sleeve 8 on the left in FIG. 5a.

The overlapping of the sleeve 8 and sheathing 12 has the effect that the optical fiber 2 is protected from outside influences, and in particular from buckling, at that location at which the sheathing 12 is detached. In particular, tensile forces present in the fiber-optic cable 13 can be passed on from the sheathing 12 via the adhesive bond to the sleeve 8 and absorbed by the latter. As a result, the optical fiber 2 is relieved of tension.

According to one embodiment of the invention, the optical fiber 2 has a diameter of 125 μm; this is the case in particular with a standard single-mode fiber. The fiber-optic cable 13 comprising the optical fiber 2 and the sheathing 12 here has in particular a diameter of 900 μm. In this case, the sleeve 8 preferably has in its front sleeve portion 22, i.e. its portion toward the extreme end 14 of the optical fiber 2 to be coupled, by which portion the associated, exposed end portion 10 of the optical fiber 2 is surrounded, an inside diameter of approximately 128 μm and in its rear portion 20, i.e. its portion remote from the extreme end 14 of the optical fiber 2 to be coupled, by which portion the associated portion of the optical fiber 2 not freed of the sheathing 12 is surrounded, an inside diameter of 903 μm.

The sleeve 8 may be a part made of a single material, in which two central longitudinal bores of different diameters in line with each other are provided for receiving the exposed optical fiber portion 10 and the optical fiber portion sheathed by the sheathing 12. The sleeve may, however, also be made up of two separate sleeve parts, the front sleeve portion 22 being formed by a first sleeve part and the rear sleeve portion 22 being formed by a second sleeve part, the sleeve parts being placed against each other and solidly joined together at the extreme ends, for example by means of adhesive bonding, thereby forming the sleeve 8.

FIG. 5b shows the optical fiber coupling unit 1 from FIG. 5a in a view from the front, i.e. from the right in FIG. 5a, so that the sleeve 8 and the optical fiber 2 inserted in it and also the associated coupling face 16 can be seen.

Figure 6A:
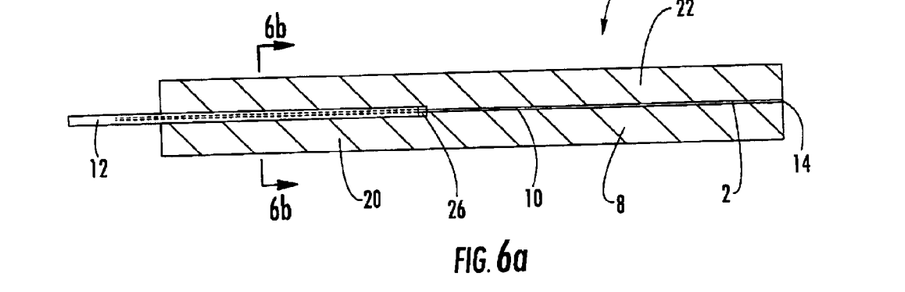
FIG. 6a shows another embodiment of the optical fiber coupling unit according to the invention in longitudinal section.
Figure 6B:
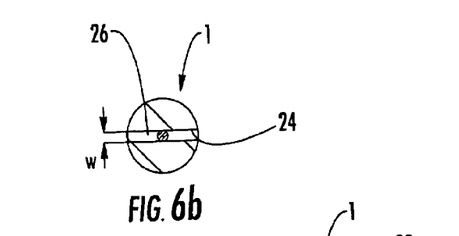
FIG. 6b shows the optical fiber coupling unit from FIG. 6a in cross section along the line designated in FIG. 6a by 6b–6b.

Another embodiment of the invention, which represents a variant of the embodiment shown in FIGS. 5a, 5b, is shown in FIGS. 6a, 6b. FIG. 6a shows here a longitudinal section of the optical fiber coupling unit 1 according to the invention, and FIG. 6b shows the optical fiber coupling unit 1 in a cross section along the line designated by 6b–6b in FIG. 6a.

As can be seen from FIG. 6a, the sleeve 8 according to this embodiment, like the sleeve 8 according to FIGS. 5a and 5b, is designed in such a way that it extends with a rear sleeve portion 20, remote from the extreme end 14 of the optical fiber 2 to be coupled, over the sheathing 12 of the optical fiber 2. By contrast with the sleeve 8 according to FIGS. 5a and 5b, however, the rear sleeve portion 20 is not provided like the front sleeve portion 22 as a closed sleeve part. Instead, the sleeve 8 is provided in its rear sleeve portion 20, remote from the extreme end 14, with a central transverse slit 24, which is continuous in the direction of the diameter of the sleeve 8 and extends over the entire axial length of the rear sleeve portion 20, which for its part makes up approximately half the axial length of the sleeve 8. The transverse slit 24 has a width w (see FIG. 6b), which is slightly greater, in particular 2 to 10 μm greater, than the outside diameter of the sheathing 12, so that the transverse slit 24 forms a slit space 26, in which the optical fiber 2 is accommodated together with its sheathing 12 in such a way that it is virtually free from play on two sides. If the aforementioned sheathing 12 with an outside diameter of 900 μm is used, the transverse slit 24 preferably has a width w of 903 μm. The lateral fixing of the sheathed optical fiber 2 in a direction parallel to the slit walls is achieved in particular by the optical fiber 2 with sheathing 12 being bonded into the slit space 26.

The embodiment according to FIGS. 6a, 6b has the advantage that a transverse slit 24 of a width w in the μm range can be produced more easily than an axial bore with a diameter likewise in the μm range.

Figure 7A:
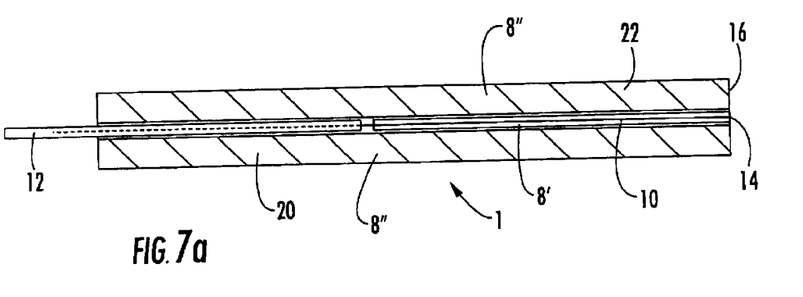
FIG. 7a shows another embodiment of the optical fiber coupling unit according to the invention in longitudinal section.

FIG. 7a shows another embodiment of the optical fiber coupling unit 1 according to the invention in longitudinal section.

The optical fiber coupling unit 1 according to this embodiment has a two-part sleeve 8 with an inner sleeve 8' and an outer sleeve 8". The inner sleeve 8' is arranged on an exposed end portion 10 of the optical fiber 2 and closely encloses the optical fiber 2 in this exposed end portion. The inner sleeve 8 has an outside diameter which corresponds approximately to that of a sheathing 12, by which the optical fiber 2 is otherwise surrounded.

The outer sleeve 8" is arranged with a front sleeve portion 22 on the inner sleeve 8' and extends with a rear sleeve portion 20 part way over the part of the optical fiber 2 that is surrounded by the sheathing 12, adjoining the exposed portion 10 of the optical fiber 2. The outer sleeve 8" is, furthermore, firmly fixed on the inner sleeve 8, preferably by means of an adhesive agent. The inner sleeve 8' and the outer sleeve 8" are preferably made of the same material, in particular of a material which has a coefficient of thermal expansion corresponding to the optical fiber 2.

The inner sleeve 8' and the outer sleeve 8" terminate flush with the extreme end 14 on the right in FIG. 7a of the optical fiber 2, so that on the associated extreme end there is formed a continuous, planar coupling face 16, with which the optical fiber coupling unit 1 can be placed against a placement face on an optical waveguide component, in order to couple the optical fiber 2 optically to this optical waveguide component.

Both the outer sleeve 8" and the inner sleeve 8' are provided in the present case as closed sleeve parts and consequently extend uninterruptedly around the optical fiber 2. However, in a way corresponding to the embodiment according to FIGS. 6a, 6b, the outer sleeve 8" may also be provided in its rear sleeve portion 20, remote from the one extreme end 14 of the optical fiber 2, with a transverse slit, in which the optical fiber 2 together with its sheathing 12 is accommodated and bonded in place.

The outer sleeve B" serves for the optical fiber 2 as tension relief and as protection against buckling, in order to prevent buckling of the optical fiber 2 at the location at which it leaves the inner sleeve 8'.

Commercially available capillaries or ferrules with a constant inside diameter are used with preference as the outer sleeve 8" and as the inner sleeve 8'. The embodiment consequently has the advantage over those according to FIGS. 5a, 5b and 6a, 6b that it can be realized at lower cost, since the sleeve 8 can be put together just from standard components.

The outside diameter of the inner sleeve 8' may also be different from the outside diameter of the sheathing 12. If in this case an outer sleeve with a constant inside diameter, which is adapted to the greater outside diameter of either the sheathing 12 or the inner sleeve 8' is used, an intermediate space present as a result between the sheathing 12 or the inner sleeve 8' and the inner wall of the outer sleeve can be filled with a filler, for example an adhesive agent.

Figure 7B:
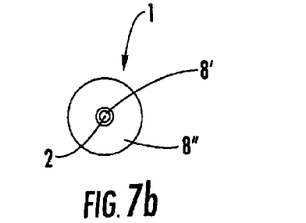
FIG. 7b shows the optical fiber coupling unit from FIG. 7a in a view from the front, and FIG. 8 schematically shows an optical waveguide arrangement according to one embodiment of the invention.

FIG. 7b shows the optical fiber coupling unit from FIG. 7a in a view from the front, i.e. in a view from the right in FIG. 7a. The optical fiber 2, the inner sleeve 8' and the outer sleeve 8', which are arranged concentrically with respect to each other and with respect to the optical fiber 2, can be seen from this.

In the exemplary embodiments, a sleeve 8 with a circular-cylindrical outer shape and circular-cylindrical inner shape for accommodating the exposed optical fiber 2 has been described. The sleeve 8 may also have a different outer cross section and a different inner cross section, for example it may have an oval or angular cross section on the outside and/or inside.

In the case of the exemplary embodiments described, the optical fiber 2 and the sleeve 8 are arranged concentrically with respect to each other. Although this concentric arrangement is preferred, the optical fiber 2 may also be arranged offset from the longitudinal axis of the sleeve 8.

Figure 8:
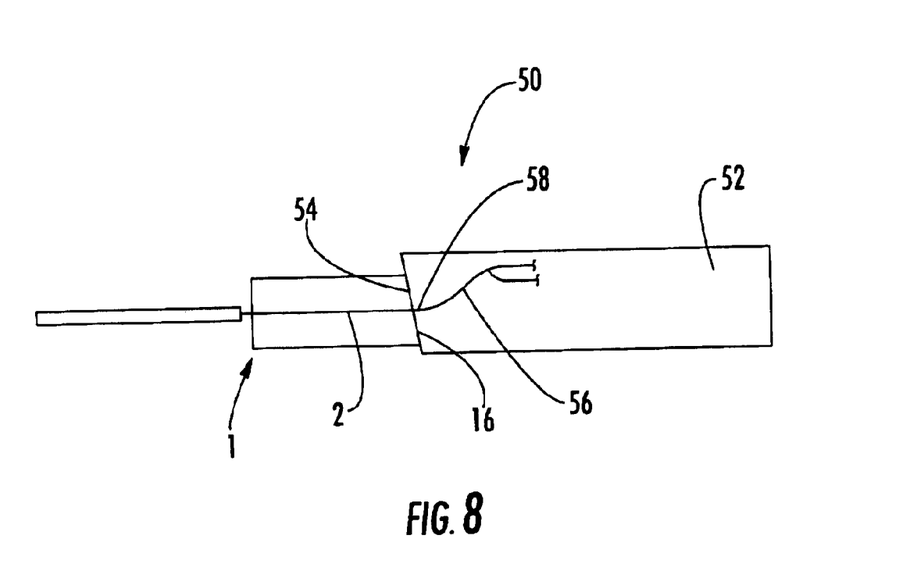

In FIG. 8, an optical waveguide arrangement 50 according to the embodiment of the invention is represented. The optical waveguide arrangement 50 has an optical chip 52, on which there is provided a planar placement face 54, from which there extends an optical structure 56, which opens out with one end at the placement face 54. The arrangement 50 has, furthermore, an optical fiber coupling unit 1 according to the invention, which is placed with its coupling face 16 against the placement face 16 of the optical chip 52, thereby establishing an optical coupling between its optical fiber 2 and the optical structure 56, and is fastened on said placement face, in particular bonded in place. The adhesive is preferably applied here to the entire coupling face 16, so that the extreme end 14 of the optical fiber 2 is also covered.

In the present case, the coupling face 16 and the placement face 54 are in each case designed as sloping faces, which are respectively inclined at an angle of 82 degrees with respect to the longitudinal axis of the optical fiber 2. The coupling face 16 and the placement face 54 run parallel to each other, the optical fiber 2 being aligned in its longitudinal direction with the end portion 58 toward it of the optical structure 56.

What is claimed is:

1. An optical fiber coupling unit comprising:
    an optical fiber and a sleeve, wherein the optical fiber has a sheathing, and the end portion of the optical fiber is accommodated in the sleeve and has a portion of the sheathing removed, the sleeve further comprising an inner sleeve and an outer sleeve, the inner sleeve being arranged on the end portion of the optical fiber, and the outer sleeve extending with a sleeve portion remote from the one extreme end of the optical fiber over a portion of the sheathing and having about the same outside diameter as the sheathing, and
    the outer sleeve having a planar surface adjacent to its circumferential surface and an end face, the sleeve being arranged on an end portion of the optical fiber with the end face terminating flush with an end of the optical fiber, thereby forming a continuous coupling face so that the optical fiber coupling unit can be placed onto an optical waveguide component to establish an optical coupling.

2. The optical fiber coupling unit according to claim 1, the optical fiber being surrounded by the sleeve with a distance between the optical fiber and the inner wall of the sleeve being about 1–5 μm.

3. The optical fiber coupling unit according to claim 1, wherein the optical fiber is bonded to the sleeve using an adhesive.

4. The optical fiber coupling unit according to claim 1, wherein the continuous coupling face extends at an angle of about 82 degrees with respect to a longitudinal axis of the optical fiber.

5. The optical fiber coupling unit according to claim 1, wherein the sleeve is made of a material having a coefficient of thermal expansion corresponding to about that of the optical fiber.

6. The optical fiber coupling unit according to claim 1, wherein the sleeve is made of a material selected from the group of a glass and a ceramic.

7. The optical fiber coupling unit according to claim 1, wherein the sleeve has an outside diameter between about 2 mm and about 10 mm.

8. The optical fiber coupling unit according to claim 1, the planar surface extending to the continuous coupling face.

9. The optical fiber coupling unit according to claim 1, the sleeve having a sleeve portion remote from the end of the optical fiber that surrounds a portion of the sheathing, a distance between the sheathing and the inner wall of the sleeve being about 1–5 μm.

10. The optical fiber coupling unit according to claim 9, the sleeve being transversely slit in its sleeve portion remote from the end of the optical fiber, thereby forming a slit space with a portion of the optical fiber having its sheathing being arranged in the slit space.

11. The optical fiber coupling unit according to claim 1, the inner sleeve being bonded to the outer sleeve with an adhesive.

12. The optical fiber coupling unit according to claim 1, the sleeve having a length of at least about 2 mm.

13. An optical waveguide arrangement comprising an optical waveguide component, said optical waveguide component having a placement face, from which an optical structure extends, and an optical fiber coupling unit, the optical fiber coupling unit comprising a sleeve having a longitudinal length with an optical fiber attached thereto, the optical fiber coupling unit having a partial circumferential surface adjacent to a planar surface, wherein the planar surface bisects the partial circumferential surf ace along a majority of the longitudinal length of the sleeve with a coupling face on an end portion of the sleeve, the optical fiber coupling unit being attached so that its coupling face is adjacent to the placement face of the optical waveguide component, thereby establishing an optical coupling between the optical fiber and the optical structure.

14. An optical fiber coupling unit comprising an optical fiber and a sleeve, the sleeve having a first end, a planar surface, a partial circumferential surface, and a coupling end, wherein the planar surface extends from the coupling end to the first end;
    the sleeve being arranged on an end portion of the optical fiber and with the coupling end terminating flush with an end of the optical fiber, thereby forming a continuous coupling face so that the optical fiber coupling unit can be placed onto an optical waveguide component to establish an optical coupling.

15. The optical fiber coupling unit according to claim 14, wherein the planar surface is disposed at an angle with respect to the continuous coupling face.

16. The optical fiber coupling unit according to claim 14, wherein the planar surface is disposed at an angle of about 82 degrees with respect to the continuous coupling face.

17. An optical waveguide arrangement comprising an optical waveguide component, said optical waveguide component having a placement face, from which an optical structure extends, and an optical fiber coupling unit comprising a sleeve with an optical fiber attached thereto, the sleeve having a first end, a planar surface, a partial circumferential surface, and a coupling end, wherein the planar surface extends from the coupling end to the first end, wherein the optical fiber coupling unit being is attached so that its coupling end is adjacent to the placement face of the optical waveguide component, thereby establishing an optical coupling between the optical fiber and the optical structure.

* * * * *